Jan. 31, 1961 M. PEETERS 2,969,893
CONSTANT WEIGHT FEEDER
Filed March 2, 1959 3 Sheets-Sheet 1

Inventor
MARTIN PEETERS

Jan. 31, 1961         M. PEETERS         2,969,893
CONSTANT WEIGHT FEEDER
Filed March 2, 1959                    3 Sheets-Sheet 2

Inventor
MARTIN PEETERS
by:

Inventor
MARTIN PEETERS

United States Patent Office 2,969,893
Patented Jan. 31, 1961

2,969,893
CONSTANT WEIGHT FEEDER
Martin Peeters, 69 Lakewood Drive, Oakville, Ontario, Canada
Filed Mar. 2, 1959, Ser. No. 796,699
8 Claims. (Cl. 222—23)

This invention relates to a constant weight feeder which is adapted to feed accurately bulk material from a source of supply at a constant rate, in terms of weight, per unit of time.

A constant weight feeder is a device for withdrawing bulk material from a source of supply at a predetermined rate in terms of weight per unit of time. They are known and are in relatively widespread use. They are used, for example, in feeding bulk materials, such as sand, gravel, cement, coal, coke, limestone and the like from a source of supply, such as a storage hopper or bin, at a constant rate, in terms of weight, to a point of discharge which may be a point of use or of mixing with other materials.

There are various types of constant weight feeders now in use. They include belt conveyors with provision for weighing the load on the belt as the material advances to its point of discharge in combination with electrically or mechanically actuated bin gates; weigh belt conveyors in combination with vibrating feeders; and constant weight feeders which discharge batches of bulk material of desired weight at equal intervals.

Problems are encountered in the use of known constant weight feeders which arise from the fact that they must be accurate within narrow overweight and underweight limits regardless of the size and irregularities in the shape of the material. For example, in the case of a weigh belt conveyor with a bin gate, oversize lumps may block the passages in the bin gate during periods the gate is opened narrowly to permit the dribble or flow of only a small amount of material to compensate for an overweight on the belt. A further problem is that of the continuous coupling between the weighing device and the bin gate operating device of many of the known constant weight feeders which results in a "hunting" effect. Each time the load crossing the scale varies, as it frequently does due to irregularities in the flow from the bin, the gate continues to open, or close, until an overweight, or underweight, is built up, reaches the scale and causes the gate to start to close, or open. This continual fluctuation results in an average rather than a constant weight of feed which may vary appreciably from the desired rate at any given time.

An important object of this invention is to provide an improved form of constant weight feeder which delivers a precisely weighed batch of material in a unit of time which is fixed by the weight of the batch.

I have found, that difficulties encountered in the operation of conventional constant weight feeders can be overcome by feeding bulk materials from a source of supply in individual batches, preferably but not necessarily, of approximately equal weight, into a receptacle and beginning the discharge of each batch from the receptacle at the instant there is a predetermined ratio between the weight of the batch and the time elapsed since the beginning of the discharge of the immediately preceding batch.

The constant weight feeder of this invention comprises, in general, a receptacle for bulk material, intermittently actuated means for feeding said material from a source of supply into said receptacle in individual batches of random weights, means for weighing each batch of material fed into said receptacle, means for discharging each batch from said receptacle, and a timing device for actuating said discharging means at an instant determined by the weight of the batch of material in said receptacle.

An understanding of the constant weight feeder of this invention can be obtained from the following description, reference being made to the accompanying drawings in which.

Like reference characters refer to like parts throughout the description and drawings.

Figure 1:
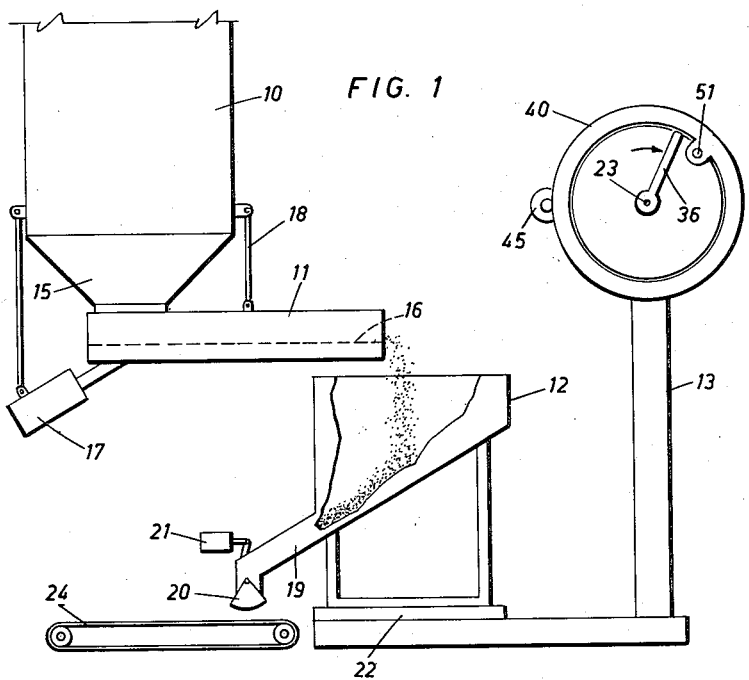
Figure 1 is a schematic view of an embodiment of the constant weight feeder of this invention showing a batch of material being fed into the receptacle.
Figure 2:
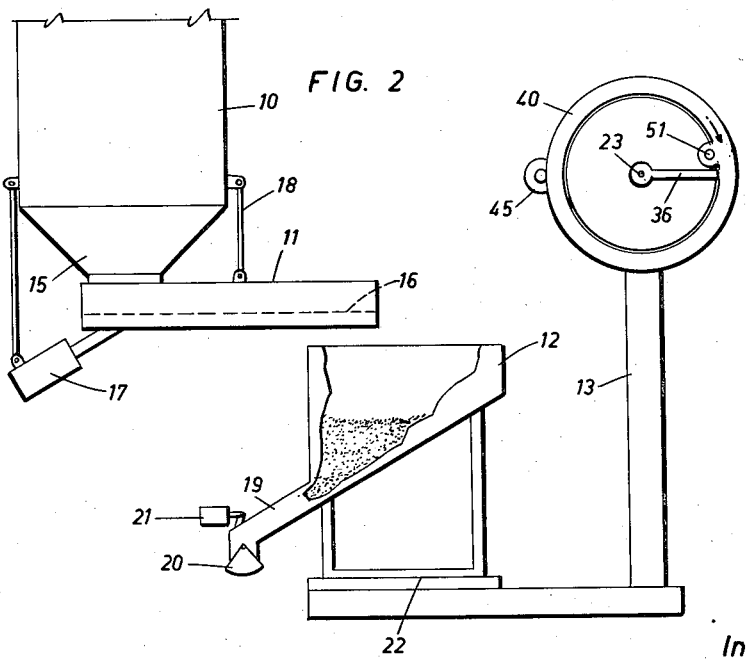
Figure 2 is a schematic view of the constant weight feeder after the feeding device has stopped and the batch of material is retained in the receptacle awaiting release of the discharge mechanism by the timing device.
Figure 3:
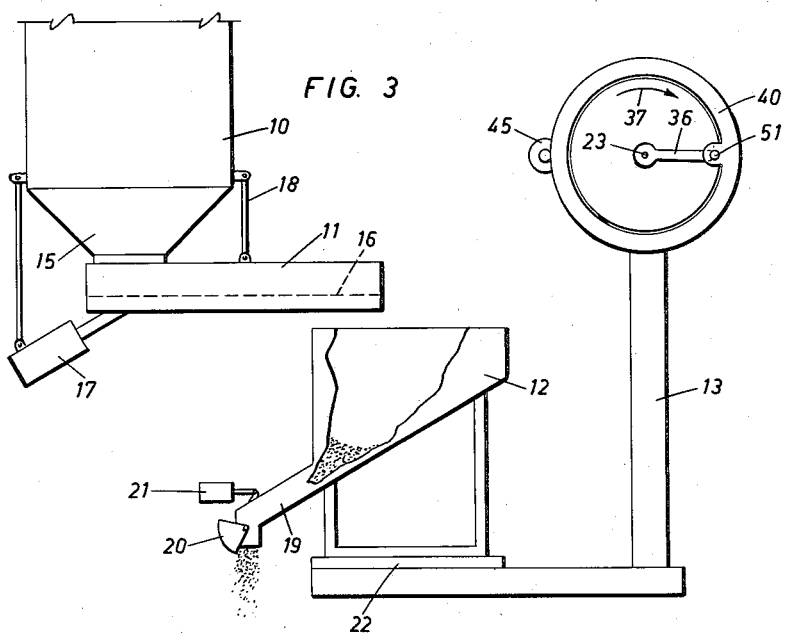
Figure 3 is a schematic view of the constant weight feeder at the beginning of discharge from the receptacle of the batch of material shown in Figures 1 and 2.
Figure 4:
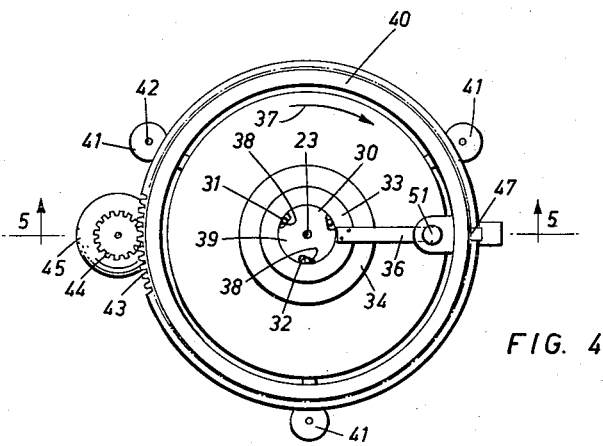
Figure 4 is a detail view of the timing device illustrated in Figures 1, 2 and 3.
Figure 5:
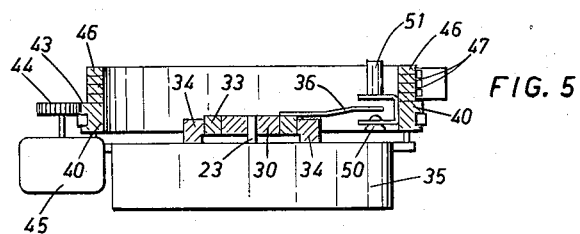
Figure 5 is a section taken along the line 5—5 of Figure 4.
Figure 6:
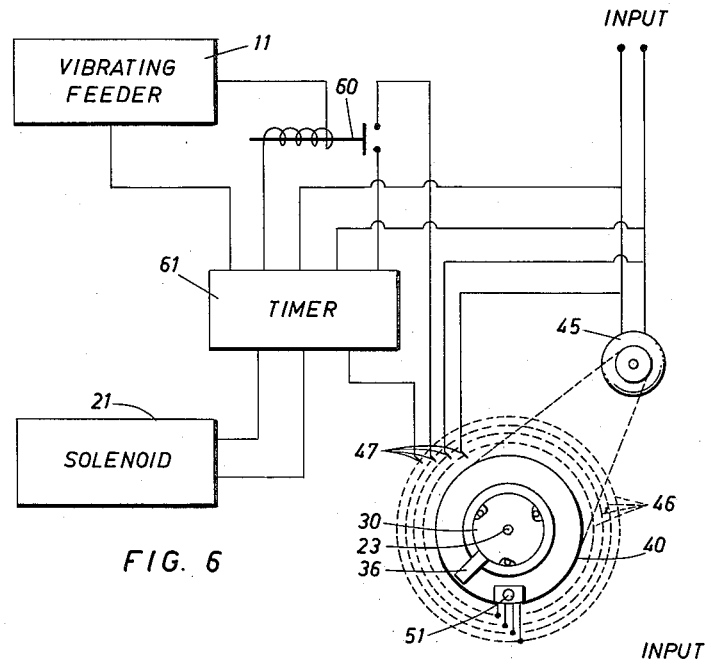
Figure 6 is a wiring diagram suitable for the embodiment of the invention illustrated in Figures 1, 2, 3, 4 and 5.

The modification of the constant weight feeder of this invention comprises means for feeding bulk material from a source of supply to the receptacle, such as a vibrating feeder 11; a receptacle 12 for receiving bulk material from the feeder 11, a weighing device indicated by the numeral 13 and a timing device, all of which are electrically interconnected as described in detail hereinafter.

A source of supply of bulk material is, of course, necessary for the operation of the constant weight feeder but does not form part of the present invention. It can be in the form of a hopper or bin 10 which is adapted to receive, store, and discharge the bulk material to be fed in batches, preferably of approximately equal weight, to the receptacle 12. It can be provided, if desired or necessary, with a shutter or gate, not shown, to close the outlet passage 15 at the base of the hopper. Also, if desired, the hopper can be provided with a conventional agitating device, not shown, to agitate the material to prevent "bridging" and ensure its free flow therefrom.

A vibrating feeder 11 is positioned below the outlet passageway 15 of the hopper 10 to receive bulk material from the hopper and deliver it to the receptacle 12. This vibrating feeder is of conventional design and, usually, is comprised of a feed chute 16 which is vibrated at high frequency by means of the oscillating armature of an electromagnetic device 17. The vibrating feeder, shown in the drawings, is suspended according to conventional practice, such as from the hopper 10 by means of rods 18. Other arrangements can be provided, of course, for feeding the bulk material in batches into the receptacle. For example, a motor driven belt conveyor can be substituted for the vibrating feeder or the receptacle 12 can be positioned below the outlet passageway 15 of the hopper 10 and the bulk material can then be discharged directly into the receptacle 12 by means of a bin gate.

The specific arrangement for feeding the material to the receptacle in batches, while necessary, does not form part of this invention and any suitable, conventional arrangement can be employed. The electromagnetic device 17 can be electrically interconnected with other parts of the apparatus by means of which it is energized for a predetermined period during which the receptacle 12 is charged with a batch of material.

The receptacle 12 preferably is hopper-shaped and is of a size sufficient to contain a reasonable excess of the approximate amount of material it is expected to receive in each batch. The bottom of the receptacle is slanted towards a spout 19 through which the material is discharged. The spout 19 is sufficiently large to permit the free flow of material regardless of its shape and size. An automatically actuated closure member 20, such as a gate or shutter, is provided at the outlet end of spout 19. In the modification illustrated in the drawings, the closure member is in the form of a pivotally mounted discharge gate, actuated by a solenoid 21.

A belt conveyor 24 can be provided, if desired, below the discharge spout 19 to convey the bulk material from the receptacle in a continuous stream.

The receptacle 12 is attached to the platform 22 of the weighing device 13, the indicator spindle 23 of which rotates through an arc proportional to the net weight of a batch of material fed to the receptacle during a particular feeding cycle.

A suitable timing device which is adapted to close and open the circuit to the solenoid 21 which, in turn, opens and closes the closure member 20 of receptacle 12 at intervals regulated by the weight of a batch of material in the receptacle comprises an assembly of mechanical and electrical parts described in detail hereinafter.

A disc 30 is attached to and is rotatable with the indicator spindle 23 of the weighing device, the axes of the disc 30 and spindle 23 being coincident. Rollers 31 are located in pockets 32 formed in the face of disc 30. These pockets preferably are formed with inclined faces 38. A totalizer ring 33 is journaled in a ring 34, which is attached to the dial housing 35 with its axis coincident with the axis of indicator spindle 23. The inside diameter of totalizer ring 33 is slightly larger than the outside diameter of disc 30. Attached to totalizer ring 33 is a vane 36.

When indicator spindle 23 is moved in the direction of the arrow 37 by the weight of a batch of material in the receptacle, which direction hereinafter will be called the clockwise direction, the rollers 31 are adapted to bind between inclined faces 38 and the inside surface 39 of totalizer ring 33, whereby the disc 30 and totalizer ring 33 are temporarily locked together. When the disc 30 moves in counterclockwise direction, the rollers 31 are released so that the totalizer ring 33 will not return to its starting position. It will thus be observed that the oscillation of indicator spindle 23, as it is actuated by the weight of successive batches of material in the receptacle 12, will cause intermittent movement of the ring 33 in a clockwise direction only and that the angle through which totalizer ring 33 and vane 36 move during a given period of time will be proportional to the total weight of the batches of material, weighed during that same period of time.

The above described arrangement for rotating the totalizer ring 33 is, of course, only one of several arrangements which can be employed to obtain the same net results without departing from the scope of the present invention. For example, an electrically operated friction coupling can be provided which automatically connects a ring or shaft to the indicator spindle during rotation in one direction of this spindle and which keeps the ring or shaft disconnected during rotation of the indicator spindle in the opposite direction.

A rotatable ring 40 is supported by rollers 41 which are journaled and carried by pins 42. The ring 40 is rotated about the same axis as the indicator spindle 23 in a clockwise direction at a constant speed by means of the gear 43 driven by a pinion 44 which is driven by a constant speed motor 45. The ring 40 carries a light source 50 and photo-electric cell 51 so placed that, as ring 40 rotates, there are positions in which the vane 36 is between the light source 50 and photo-electric cell 51, thus preventing photo-electric cell 51 from receiving light from light source 50. Slip rings 46 are carried by and rotate with ring 40. Contacts 47 are attached to the stationary dial housing 35 and make contact with the rotating slip rings 46. The slip rings 46 are electrically connected to the light source 50 and are connected, also, to the cell 51.

The electrical circuit is arranged so that when vane 36 interrupts the light beam between light source 50 and the photo-electric cell 51, the timer 61 is energized and starts the following sequence of operations, provided interlocking switch 60 is closed:

(a) Solenoid 21 is energized and opens gate 20 to permit discharge of the batch of material contained in receptacle 12.

(b) Solenoid 21 remains energized for a period of time sufficient to ensure discharge of all material contained in receptacle 12.

(c) Solenoid 21 is de-energized and discharge gate 20 is closed.

(d) Closing of the discharge gate 20 is followed by closing the circuit to magnetic device 17 which actuates feeder 11 to deliver material to receptacle 12.

(e) Magnetic device 17 is energized for a predetermined period of time sufficient to deliver approximately a desired amount of material to the receptacle 12.

(f) The circuit to magnetic device 17 is opened and the feeder is stopped.

This is the last operation of each cycle.

The modification of the constant weight feeder illustrated in Figures 1 through 6 operates as follows:

Assume a constant weight rate of feed of 45 tons per hour is desired of, for example, cement clinker for admixture with gypsum in desired ratios, which can be fed by another feeder, for the manufacture of cement. 45 tons per hour is 25 pounds per second or 1,500 pounds per minute. The constant weight feeder is adjusted so that one revolution of the totalizer ring 33 represents 1,500 pounds and ring 40 makes one complete revolution in 60 seconds. The combination light source 50 and photoelectric cell 51 and the vane 36 are, at the beginning of the operation, assumed to be set at their zero points on the dial and the receptacle is assumed to be empty. The period during which bulk material is fed to the receptacle is adjusted to deliver about 250 pounds in each batch so that the discharge gate 20 is opened at about 10 second intervals, which may be somewhat shorter or longer depending on the underweight or overweight of a particular batch. This gives ample time for the sequence of electrical and mechanical operations necessary to feed each batch of material into and discharge it from receptacle 12.

When the constant weight feeder is put into operation, motor 45 starts to drive the ring 40 in clockwise direction and feeder 11 feeds material to receptacle 12.

Assume the first batch delivered to the receptacle weighs exactly 250 pounds, the totalizer ring 33 with vane 36 swings to the right to a point at the 250 pounds marking on the dial. This point is located 60 degrees in clockwise direction from zero point. The combination light source 50 and photo-electric cell 51 reaches the 60 degree point and overtakes the vane 36 10 seconds after starting from the zero point. The circuit to the solenoid 21 is then closed and the discharge gate 20 is opened to its fullest extent to discharge completely the batch from the receptacle 12. The discharge gate is timed by means of electrical timer 61 to remain open a predetermined interval sufficient for the discharge of all the material contained in the receptacle 12 and is then closed. The closing of the gate 20 is followed by closing the electric circuit to the electromagnetic device 17 for a timed interval sufficient to actuate the feeder to deliver a second batch of material to the receptacle. This is weighed as it is received in the receptacle. Assume the second batch weighs 300 pounds. The vane 36, which was stationary during discharge of the first batch, moves from the 250 pound point of the dial to the 550 pound point. The second batch is discharged when the combination light source and photo-electric cell reaches the position of vane 36, which takes place 12 seconds after beginning of discharge of the first batch.

Assume the third batch weighs only 200 pounds. This would move the vane 36 to the 750 pound point on the dial and the batch is discharged when the combination light source and photo-electric cell reaches this point 8 seconds after beginning of discharge of the second batch.

During clockwise rotation of totalizer ring 33 under action of the weight of the material fed to the receptacle, the vane will overtake combination light source 50 and photo-electric cell 51. This will, under these circumstances, not result in actuating electric timer 61 because interlocking switch 60 is open during operation of vibrating feeder 11 so that the electric timer cannot be energized.

It will be observed, therefore, that the discharge of each batch of material from the receptacle 12 will begin at the instant that one second has elapsed for every 25 pounds of material in the receptacle, since the beginning of discharge of the previous batch. In other words, the weight of material discharged per unit of time will be found to be constant throughout any period of operation of the constant weight feeder, if measured between instants of beginning of discharge.

The ratio between weights of batches of material and the time interval between discharge of batches can be changed by changing the speed of the ring 40. Variation of the rate of weight discharged from the receptacle can therefore be obtained by changing the speed of the motor 45 in terms of revolutions per minute.

Figure 7:
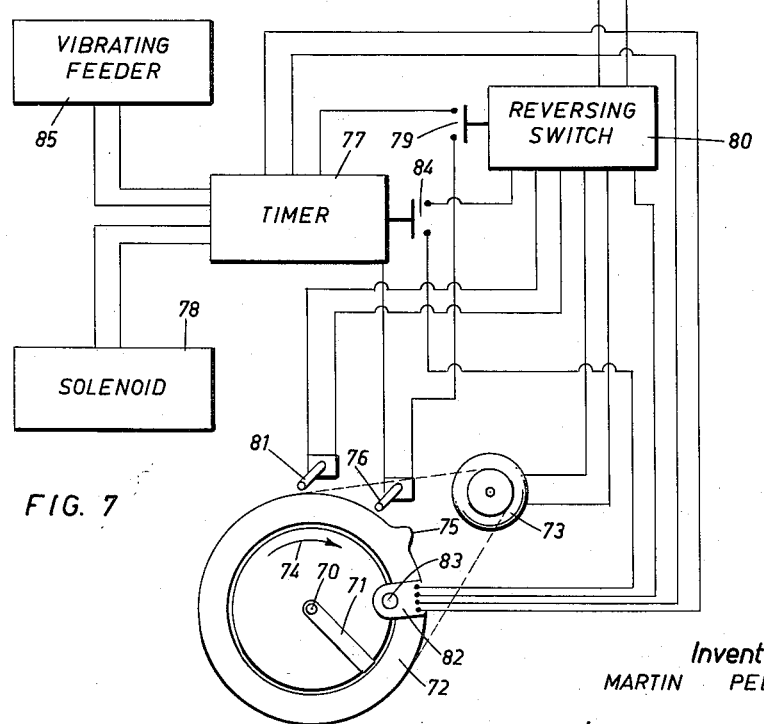
Figure 7 is a wiring diagram suitable for an alternative modification of the timing device.

The desired relationship between the weight of the batches of material and time intervals between beginnings of discharge of material from the receptacle can also be obtained by means of an alternative embodiment of the timing device, as shown in Figure 7. In this modification, the indicator spindle 70 carries an indicator 71 the position of which is determined by the weight of the material in the receptacle.

The timing device is in the form of a ring 72 supported in the same manner as ring 40. Ring 72 is driven by a constant speed, reversible motor 73. The direction of rotation of ring 72, indicated by arrow 74, will hereinafter be referred to as the clockwise rotation, the opposite movement will be referred to as the counterclockwise rotation.

The ring 72 carries a cam 75 which trips switch 76 in passing. Switch 76 is supported by the dial housing. The electrical circuit is so arranged that when cam 75 trips switch 76 during counterclockwise rotation of ring 72, the electrical timer 77 starts a cycle of operations which consist of energizing solenoid 78 during a predetermined period of time which causes the receptacle discharge gate to open and allows the material in the receptacle to be discharged. This is followed in sequence by energizing the electro-magnetic device which drives the feeder during a predetermined period to feed an amount of material to the receptacle. The interlocking switch 79, actuated by motor reversing switch 80, prevents starting of the described discharging and feeding cycle when the cam 75 trips the switch 76 during clockwise rotation of ring 72. At the end of the counterclockwise travel of the ring 72, the cam 75 trips the limit switch 81, which causes motor reversing switch 80 to change the direction of rotation of motor 73. Ring 72 will therefore travel in a clockwise direction. The limit switch 81 is attached to the dial housing. The ring 72 carries also a light source 82 and a photo-electric cell 83 so placed that as ring 72 rotates there are positions in which the end of indicator 71 will be between light source 82 and photo-electric cell 83 thus preventing the cell 83 from receiving light from the light source. The electrical circuit is so arranged that this cutting off of light will cause the motor reversing switch 80 to change the direction of rotation of motor 73 and ring 72 will therefore start to travel counterclockwise, provided that interlocking switch 84 is closed. The interlocking switch 84 is interconnected with the electrical timer 77 so that it is opened at the moment that the discharge of a batch of material from the receptacle is started and closed at the end of the feeding of the next batch into the receptacle. In other words, interlocking switch 84 is closed when the receptacle contains a batch of material and indicator 71 has come to a stop.

A complete cycle of operations is described to illustrate the functioning of this modification of the constant weight feeder of this invention.

The receptacle contains a batch of material and the ring 72 is rotating in counterclockwise direction. When cam 75 trips switch 76 in passing, the electric timer 77 will be energized, first causing the receptacle discharge gate to open, which will allow the batch of material in the receptacle to be discharged, thereafter the electric timer 77 will cause the receptacle gate to close. The electric timer 77 will then cause the electro-magnetic device of vibrating feeder 85 to be energized during a predetermined period of time, thereby feeding a batch of material into the receptacle. During the described discharging and feeding cycle, the indicator 71 will first move in counterclockwise direction and thereafter in clockwise direction and will pass during its oscillation between light source 82 and photo-electric cell 83. This will, under these circumstances, not result in reversal of direction of ring 72 as the indicator 71 is in motion and interlocking switch 84 accordingly will be open, thus preventing the photo-electric cell 83 from actuating motor reversal switch 80. When the feeding of material stops, the indicator 71 will have moved through an angle, proportional to the weight of the material in the receptacle. In the meantime, ring 72 has continued to move and when cam 75 trips limit switch 81, the direction of rotation of ring 72 will be changed from counterclockwise to clockwise. During its clockwise travel, cam 75 will trip switch 76 but this will not cause the opening of the receptacle discharge gate 20 because the open position of interlocking switch 79 during clockwise rotation of ring 72 makes switch 76 inoperative. At the instant that ring 72 has rotated so far that the light between light source 82 and photo-electric cell 83 is interrupted by the now stationary indicator 71, the direction of rotation of ring 72 is changed from clockwise to counterclockwise. At the instant that the cam 85 again trips switch 76, the next following discharge and feeding cycle commences.

It will be seen that between the instants at which two consecutive batches of material start to discharge from the receptacle, the ring 72 travels twice through an arc, the limits of which are determined by the position of limit switch 81 and by the position of indicator 71 after feeding a batch of material to the receptacle. A heavier load in the receptacle causes, therefore, greater duration of travel of ring 72. The position of limit switch 81 can be chosen so that the time interval during which ring 72 travels between the beginning of the discharge of any two consecutive batches of material will be proportional to the weight of the batch fed to the receptacle during said time interval. Thus, the weight of material discharged per unit of time will be found to be constant throughout any period of operation of the constant weight feeder, if measured between instants of beginning of discharge.

The ratio between the weights of batches of material and the time intervals between the discharge of batches can be changed by changing the speed of the ring 72.

Variation of the rate of weight of bulk material discharged from the constant weight feeder can, therefore, be obtained by changing the setting of the speed of the motor 73.

What I claim as new and desire to protect by Letters Patent of the United States is:

1. A constant weight feeder which comprises the combination of a receptacle for bulk material, said receptacle having an outlet and normally closed closure means for said outlet, intermittently actuated means for feeding bulk material from a source of supply to said receptacle in individual batches of random weights, means for weighing each batch of material fed into said receptacle, timing means actuated by said weighing means, means actuated by said timing means for opening said closure means at an instant determined by the weight of the batch of material in said receptacle and for closing said closure means at the end of a predetermined time, and means actuated by the closing of said closure member for energizing said intermittently actuated feeding means for a predetermined time.

2. A constant weight feeder which comprises the combination of a receptacle for bulk material, said receptacle having an outlet and a solenoid actuated, normally closed closure member for said outlet, intermittently actuated means for feeding bulk material from a source of supply to said receptacle in individual batches of random weights, means for weighing each batch of material fed into said receptacle, timing means actuated by said weighing means for energizing said solenoid means to open said closure member for a predetermined time at an instant determined by the weight of the batch of material in said receptacle, and means actuated by the closing of said closure member at the end of said time for energizing said intermittently actuated feeding means for a predetermined time.

3. A constant weight feeder which comprises the combination of a receptacle for bulk material, said receptacle having an outlet and a normally closed closure member for said outlet, an intermittently actuated vibrating feeder for feeding bulk material from a source of supply into said receptacle in individual batches of random weights, means for weighing each batch of material fed into said receptacle, solenoid means for actuating said closure member, timing means electrically connected to said solenoid and actuated by said weighing means for energizing said solenoid means to open said closure member for a predetermined time at an instant determined by the weight of the batch of material in said receptacle, and means actuated by the closing of said closure member for energizing said intermittently actuated vibrating feeder for a predetermined time during the period said closure member is in closed position.

4. A constant weight feeder which comprises the combination of a receptacle for bulk material, said receptacle having an outlet and a normally closed closure member for said outlet, intermittently actuated means for feeding bulk material from a source of supply to said receptacle in individual batches of random weights, means for indicating the weight of each batch of material fed into said receptacle, timing means actuated by said weight indicator, means actuated by said timing means for opening said closure member for a predetermined time at an instant determined by the weight of the batch of material in said receptacle and for closing said closure member at the end of said time, and means actuated by the closing of said closing member for energizing said intermittently actuated feeding means for a predetermined time.

5. A constant weight feeder which comprises the combination of a receptacle, said receptacle having an outlet and a normally closed closure member for said outlet, intermittently actuated means for feeding bulk material in batches of random weights from a source of supply to said receptacle during the period said closure member is in closed position, means for weighing each batch of material fed to said receptacle, said weighing means including a weight indicator, electrically actuated means for opening said closure member for a predetermined time to discharge a batch of material from the receptacle and for closing said closure member at the end of said predetermined time, timing means connected to said closure member opening means through said weight indicator for maintaining a constant ratio between the weight of each batch and the time interval between the start of the discharge of said batch and the start of the discharge of the next preceding batch, and means actuated by the closing of said closure member for energizing said intermittently actuated feeding means for a predetermined time.

6. A constant weight feeder which comprises the combination of a receptacle for bulk material having an outlet and a normally closed, electrically actuated closure member for said outlet, intermittently actuated means for feeding bulk material from a source of supply to said receptacle in individual batches of random weights, means for weighing each batch of material fed into said receptacle, and timing means electrically connected to said closure member and to said weighing device, means actuated by said timing means for opening said closure means for a predetermined time at an instant determined by the weight of the batch of material in said receptacle and for closing said closure member at the end of the predetermined time, and electrical means actuated by the closing of said closure member for actuating said intermittently actuated feeding means for a predetermined time.

7. A constant weight feeder which comprises the combination of a source of supply of bulk material, a receptacle for bulk material, said receptacle having an outlet and a normally closed, solenoid actuated closure member for said outlet, an intermittently actuated feeder for feeding material from said source of supply to said receptacle in individual batches of random weights, means, including a weight indicator, for weighing each batch of material fed to said receptacle, timing means actuated by said weight indicator for energizing said solenoid means to open said closure member for a predetermined time at an instant determined by the weight of the batch of material in said receptacle and for closing said closure member at the end of said predetermined time, and means actuated by the closing of said closure member for energizing said feeder for a predetermined time.

8. A constant weight feeder which comprises the combination of a receptacle for bulk material, said receptacle having an outlet and a normally closed closure member for said outlet, intermittently actuated means for feeding bulk material from a source of supply into said receptacle in batches of random weights, means for weighing each batch of material fed into said receptacle, a weight indicator actuated by said weighing means, timing means actuated by said weight indicator, means actuated by said timing means for opening said closure member for a predetermined time at an instant determined by the weight of the batch of material in said receptacle and for closing said closure member at the end of said predetermined time, and means actuated by the closing of said closure member for energizing said intermittently actuated feeding means for a predetermined time.

References Cited in the file of this patent

UNITED STATES PATENTS

| | | |
|---|---|---|
| 2,102,311 | Fisher et al. | Dec. 14, 1937 |
| 2,889,077 | Cunningham | June 2, 1959 |